June 26, 1962  H. C. HIBBARD  3,041,610
SEISMIC TRANSCRIBING SYSTEM
Filed June 22, 1959  3 Sheets-Sheet 1

Haines C. Hibbard  Inventor
By John D. Gassett  Attorney

Haines C. Hibbard  Inventor
By John D. Fassett  Attorney

June 26, 1962  H. C. HIBBARD  3,041,610
SEISMIC TRANSCRIBING SYSTEM
Filed June 22, 1959  3 Sheets-Sheet 3

3-A

3-B

3-C

3-D

Haines C. Hibbard  Inventor
By John D. Gassett  Attorney

United States Patent Office 3,041,610
Patented June 26, 1962

3,041,610
SEISMIC TRANSCRIBING SYSTEM
Haines C. Hibbard, Tulsa, Okla., assignor to Jersey Production Research Company, a corporation of Delaware
Filed June 22, 1959, Ser. No. 821,740
8 Claims. (Cl. 346—33)

This invention broadly concerns an improved seismic method and apparatus for use in geophysical prospecting. More particularly, the invention relates to an apparatus and method for recording seismic signals of the type that are generated by seismic detectors or transducers in response to reception of seismic waves. The invention especially concerns a system of transcribing seismic signals from a standard seismogram into a form of reproducible traces.

The application of geophysical techniques in prospecting for a subterranean deposit of minerals, gas and petroleum is well known. Of particular interest and value is the reflection method of seismic prospecting which uses seismic impulses that are initiated in the vicinity of the surface of the earth. In essence, each such impulse generates an elastic wave of seismic frequency which is transmitted down through the earth. As the wave encounters discontinuities in the earth's structure, such as strata of varying density, at least a portion of the energy of the wave is reflected and is turned toward the surface of the earth. One or more seismic detectors positioned at the surface of the earth generate electrical signals in response to the reception of the returning wave energy. By arranging a plurality of geophones or other seismic transducers at spaced distances from the seismic disturbance points, it is possible to detect the arrival of the reflected seismic waves at the surface of the earth. Furthermore, by using accurate timing devices and recording means, it is possible to determine not only the magnitude of the signals received of the various geophones, but also to measure the time required for the seismic waves to travel from the disturbance point down to the various discontinuities and thence, to the geophones. It is well known to those in the art that it is possible to calculate and determine the depths of the various discontinuities beneath the surface of the earth.

Generally speaking, the "seismic signal" generated by each detector or a group of detectors in a seismic observation is recorded in the form of a separate trace on a seismogram. In other words, each trace on a seismogram is a record with time of the variations in the output of the detector associated with the trace.

Originally, seismogram traces were usually oscillographic type traces formed by the action of a recording pin or a beam of light on suitable recording paper or photographic film. More recently, however, it has become an increasing practice to record seismic detector signals in the form of reproducible traces such as variable density, or variable area photographic traces, magnetic traces, and the like.

Reproducible traces have become especially desirable since equipment and methods are now available for automatically reproducing, correcting, and re-recording such traces in the form of seismic sections. Indeed, seismograms containing reproducible trace information possess so many desirable features that it has been found advantageous to convert visual non-reproducible oscillographic type trace seismic records into the reproducible type.

Records of the oscillographic type have been very helpful to persons engaged in seismic prospecting, but they are characterized by several disadvantages which persons skilled in the art have been attempting to overcome. For example, the traces are not reproducible and very often they overlap one another to produce an over-all presentation which is very difficult to interpret and analyze. Furthermore, it is necessary to pick out by hand apparent reflections in the traces and thereafter known mathematical relationships are applied to correct the reflection for conventional seismic errors such as spread, distance to datum, and the like. This manual method of analyzing and interpreting these records is necessarily complex, time-consuming and expensive.

It has recently been the trend in the art of seismic prospecting to record seismic observations—not as oscillographic traces—but rather as traces which are photographically reproducible. In general, these traces are characterized by possessing a substantially constant width through their length and by variable intensity which is related to the magnitude of the signal generated by the transducer, which is responsible for the trace. These traces include magnetic traces, such as are recorded on magnetic tape, magnetic wire, etc. They also include photographic traces such as variable density and variable area traces.

It is thus seen that there is a desire and need for converting oscillographic or wiggly-type traces or seismograms, into traces which are photographically reproducible. It is especially desirable to transcribe these wiggly-type traces into magnetic recording traces. As a magnetic recording of a seismic signal is obtained, in effect, by varying the magnetization of the recording medium along its length, it will be recognized that variations in the relative velocity between the recording medium and the recording head may have a serious effect upon the fidelity of the information recorded. This is true whether the seismic signal is an original signal recorded directly from the seismic detector, or whether it is a reproduced signal obtained by playing back a new recording of previously recorded information. Generally speaking, the problem is not a very serious one in recording original signals or in recording reproduced signals obtained by playing back reproducible seismograms. Such equipment and methods for processing such signals may be made substantially constant in speed. The problem, however, can be quite severe in re-recording seismic signals that are obtained by translating visible non-reproducible oscillographic type trace seismograms into reproducible seismograms. Oscillographic traces are sinusoidal in appearance and they frequently overlap one another with the result that methods and apparatus for reproducing such traces cannot conveniently be made to be constant in their rate of scan along the traces. Thus, it generally takes much more time and care to scan along an involved portion of an oscillographic trace than it does along a relatively simple portion of a trace. It is frequently advantageous to take more time with complex portions of such traces, since these portions are frequently the portions of real interest in the trace. At this point, it should be noted that apparatus and methods have been developed for reproducing otherwise non-reproducible oscillographic type traces into a variable density form.

Accordingly, it is one object of the invention to provide a system for transcribing conventional oscillographic trace records to phonographically reproducible-type seismograms. It is a more specific object of this invention to provide a system for transcribing a visible wiggly-type seismic trace into a reproducible recording on a magnetic recording medium. It is still another object of the invention to provide a system of transcribing a visible oscillographic type seismic trace into a reproducible form, wherein the adverse effect caused by the rate of scanning along the length of the trace are eliminated.

These and related objects of the invention will be expressly discussed or readily apparent in the following description. At this point it will be recalled that a magnetic record of a seismic signal is conventionally made by effecting relative movement between a recording head and magnetic recording medium and by modulating a carrier signal used to activate the recording head in response to variations in a seismic signal. The present invention improves upon this system by recording a pulse width modulated signal in which the pulses are spaced such that there are no restrictions on scanning speed rates.

In a preferred embodiment of the invention, means are provided between a light source and a light transducer means for repeatedly interrupting the beam of light transmitted to the electric transducer in a linear form so that the electric transducer voltage describes a sawtooth waveform. The interruption of the light beam is proportional to the speed of the scanning of a wiggly trace to be transcribed into a magnetic recording. The transducer is in the grid circuit of a cathode follower. The output of the cathode follower is added to the output voltage which is representative of the amplitude of the seismic signal being scanned at that instant.

It will be assumed that in the practice of this invention it is desired to transcribe a visible oscillographic or wiggly trace into a reproducible record on, for example, a magnetic recording medium. Scanning means are provided for following such wiggly traces. A transducer for converting position to voltage such as a potentiometer means is coupled to the scanning means such that the output voltage of the potentiometer means is always proportional to the instantaneous amplitude of the wiggly trace being scanned. Means are provided for restricting and cutting off the amount of light from a light source to a photo transducer such that the photo transducer voltage describes a sawtooth waveform. The interrupting of the light source is a repeated operation with each cycle representing an equal longitudinal segment of the wiggly trace being scanned. Means are provided for adding the output voltage of the seismic potentiometer means and the output voltage of the photo transducer. When the added voltage exceeds a predetermined value, a trigger circuit has a positive output and when the added voltage is less than such predetermined value, the trigger circuit has a negative output. The output of the trigger circuit then drives a magnetic recording device such as a magnetic head. The magnetic recording medium is driven past the magnetic head proportionally to the rate of scanning of the wiggly trace. It is thus seen that the signal recorded is pulse width modulated and that the number of pulses per unit length along the magnetic recording medium is independent of a scanning rate and that the width of such pulses is proportional to the amplitude of the seismic signal.

The invention may be better understood by reference to the attached drawings which illustrate a preferred embodiment of the invention, as well as the best mode contemplated for carrying out the invention.

Figure 1:
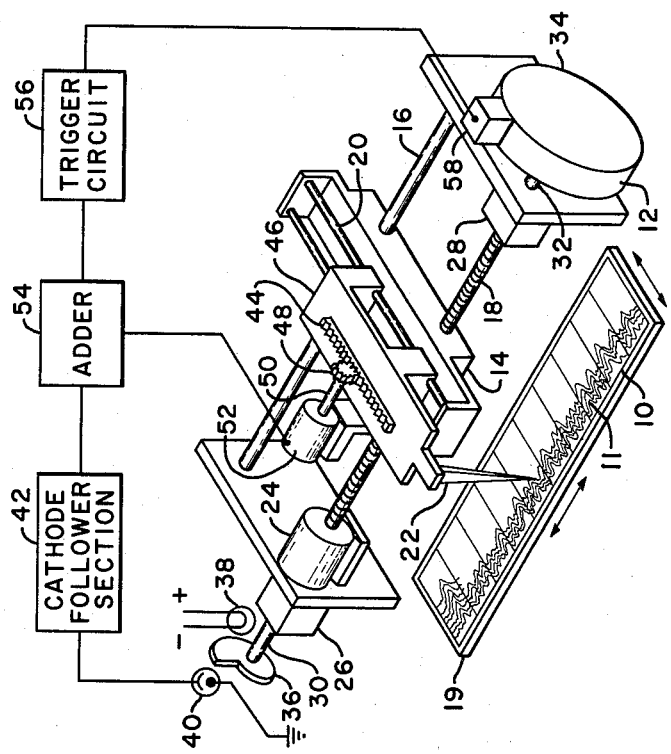
FIG. 1 is a schematic view of an apparatus embodying the principles of invention which is adapted to translate or transcribe the oscillographic traces on a seismic record to a reproducible record on a magnetic medium.

Referring first to FIG. 1 of the drawing, there are illustrated a seismic record 10 having a plurality of oscillographic traces 11; a magnetic recording medium 12, lower carriage 14, longitudinal carriage bar 16, lead screw 18, transverse carriage bars 20, and stylus 22. Also illustrated in FIG. 1 is variable speed motor 24 and gear boxes 26 and 28. The shaft of motor 24 is mechanically coupled to gear box 26 and is also connected to lead screw 18 for driving carriage 14. Lead screw 18 is connected to gear box 28 and shaft 32 connects gear box 28 with magnetic recording drum 34. Shaft 30 connects gear box 26 and a light shutter or interrupting means 36 which is provided between a light source 38 and photoelectric cell 40. A light shutter 36 such as a tone wheel is so contoured that as it is rotated it cuts off the light to photocell 40 in such a way that photocell 40 describes a sawtooth; that is, a linearly rising voltage with distance along the record. As the shutter means 36 continues to rotate, all the light is shut off and the sawtooth begins at zero again and ascends its linear ramp. The output voltage of photoelectric cell 40 is fed to the grid of cathode follower section circuit 42.

Also illustrated in FIG. 1 are a rack 44 mounted on upper carriage member 46 which, in turn, is supported on transverse carriage bars 20 which are supported from lower carriage 14. A pinion gear 48 meshes with rack 44 and has shaft 50 which is also connected to potentiometer 52. Lateral movement of upper carriage 46 causes pinion gear 48 to move relative to the rack. This movement then turns and positions the sliders within the potentiometer 52 which is mounted on shaft 50.

In a normal scanning operation, stylus 22 follows oscillographic trace 11. Therefore, the output voltage from potentiometer 52 is proportional to the amplitude of the signal being scanned. The output of potentiometer 52 is electrically connected to adder 54 which is also electrically connected to the output of cathode follower section 42. The output of adder 54 is electrically connected to trigger circuit 56. Trigger circuit 56, in turn, is electrically connected to recording head 58 on drum 34.

As illustrated in FIG. 1, lower carriage 14 is mounted upon lead screw 18 and longitudinal carriage rod 16. Transverse carriage bars 20 are, in turn, supported by lower carriage 14 and they, in turn, support the upper carriage 46. Upper cariage 46 is slidable along the length of the upper carriage bars 20 and has stylus 22 at one end mounted above the seismogram 10.

Magnetic recording medium 12 may be preferably mounted upon a recording drum 34. Drum 34 is conveniently supported near the other assembly and is rotatable past the recording head 58. Drum 34 is preferably driven by motor 24 through shaft or lead screw 18 and gear reducers 28.

It will be recognized that as stylus 22 is moved along the length of a seismogram 10, the magnetic recording medium 12 on drum 34 is similarly moved along beneath recording head 58. It should also be noted at this point that seismogram 10 is mounted on a suitable support 19 which is capable of longitudinal, as well as transverse, motion relative to the traces on the seismogram. It will be recognized that independent adjustment of the seismogram 10 by the movement of its supports is desirable from the standpoint of properly aligning the traces to be transcribed. A detailed illustration of suitable supporting means for the seismogram has not been included in the figure, in order to keep it as simple as possible. The nature of suitable supporting means, however, will be readily apparent to persons skilled in the art. It is, therefore, not considered necessary to include such information in this drawing.

While it is possible to provide means for enabling stylus 22 to automatically follow along a trace on seismogram 10, it will be assumed in the present description that stylus 22 is actuated in its lateral movements by manual means.

Longitudinal movement of stylus 22 along the length of the traces of seismogram 10 is obtained by means of motor 24 which drives lead screw 18. Lead screw 18 may be a self-reversing type resembling, for example, the self-reversing screws that are used in fishing reels. Then when lower carriage 14 reaches one end of the lead screw 18, it may reverse automatically and return to the opposite end of the screw. Limit switches may be provided at each end of lead screw 18 or carriage rod 16 to more positively limit the movement of carriage member 14 along seismogram 10. The limit switches may also be reversing switches adapted to reverse the action of motor 24 so as to automatically reverse the movement of carriage 14 when it has reached one limiting position on lead screw 18.

Drive motor 24 is preferably a variable speed motor operated, for example, by means of a foot treadle in the same manner as a sewing machine motor. As explained earlier, a variable speed drive is desirable in the apparatus of FIG. 1 since it enables an operator to scan complex portions of the seismogram 10 at slower speeds than he scans simple portions of the seismogram.

Figure 3:
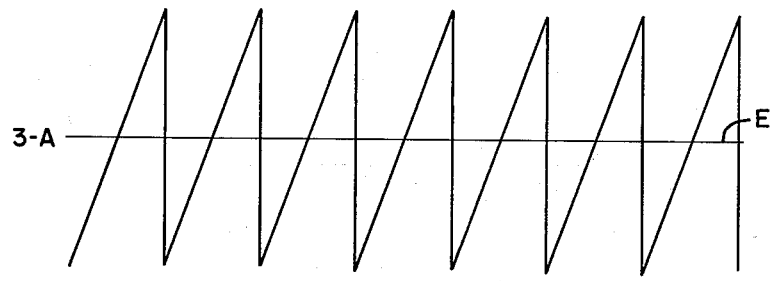
FIG. 3 illustrates curves which are typical of the signal generated by various components within the apparatus illustrated in FIGS. 1 and 2.
Figure 3:
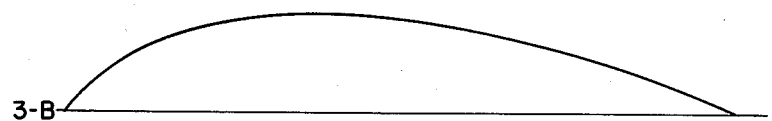
Figure 3:
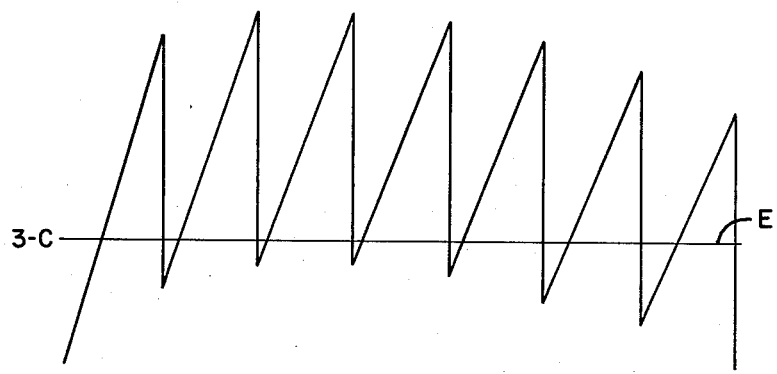
Figure 3:
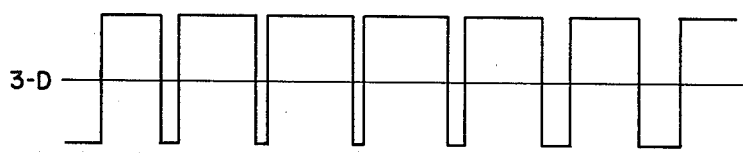

Also driven by motor 24 is tone wheel 36, which is cut to make sawtooth light wedges interrupt the photocell beam. The light reaching the photocell increases in intensity linearly with respect to the rotation of light shutter 36 and upon reaching a maximum intensity is suddenly shut off. The voltage output for photoelectric cell 40 is seen to be a series of uniform sawteeth with the occurrences of the sawteeth being directly proportional to the length of seismogram 10 scanned; that is, the number of sawteeth in a waveform from photoelectric cell is independent of the scanning rate of seismogram 10. The output of photoelectric cell 40 is illustrated in FIG. 3–A. As stylus 22 follows the traceable seismogram 10, the sliders of potentiometer 52 are rotated so that the output voltage of potentiometer 52 is proportional to the amplitude of the signal as it is scanned. The waveforms in curves A–A, 3–B and 3–C are not actual scale, but are are merely representative. Curves 3–A and 3–B, indicating the signal from cathode follower 42 and trace position potentiometer 52, respectively, are added by resistance adder means 54. The resulting summed voltage is illustrated in curve 3–C; this summed voltage switches the trigger circuit as it crosses a pre-selected voltage level E. It will be seen that the leading edge of each pulse in curve 3–D occurs at regular intervals and the position of the trailing edge varies in accordance with modulation of the amplitude of the seismic signal being transcribed. The abscissas of curve 3–D represents time on the seismogram 10. It will be noted that the time on seismogram 10 is represented by a linear dimension thereon. The relative movement of head 58 with respect to magnetic recording medium 12 is directly proportional to the movement of stylus 22 as it scans the time direction of seismogram 10.

Stated differently, the pulses from the trigger circuit 54 occur at regular intervals along the length or distance of the tape or magnetic recording medium 12 of drum 34. The width of these pulses is determined by the amplitude of the seismic signal of seismogram 10 which is being scanned. It is also to be noted that the magnetic recording medium is normally saturated in each direction; that is, the plus or negative directions. The output signal from the trigger circuit 56 is sufficient to saturate the magnetic tape. Therefore, it is seen that time is not important. In other words, the rate of scanning can be slow, fast, or it can be completely stopped and the signal will be properly recorded on the magnetic recording medium 12.

Figure 2:
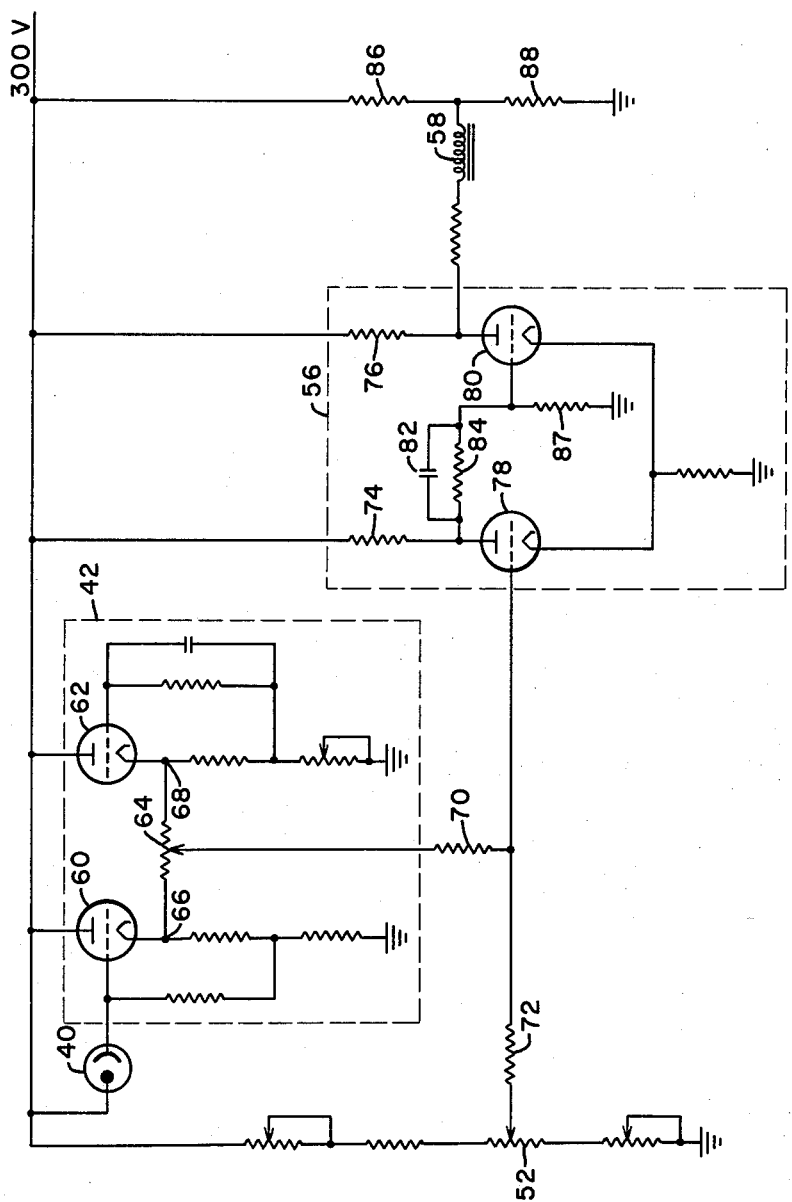
FIG. 2 is a diagram of a preferred electrical circuit for carrying out the invention.

A better understanding of the operation of the electrical circuit can be had by referring to FIG. 2. A circuit for a cathode follower section 42 is indicated in FIG. 2 and includes triode 60 and voltage reference triode 62. Photocell 40 is in the grid circuit of triode 60. Potentiometer means 64 is between triode 60 and triode 62.

The cathode follower 60 provides (1) a very high impedance load for photocell 40 which makes possible a large generated voltage and (2) provides a low impedance output such that the following circuits will not react back and distort the sawtooth. Triode 60 and 62 are balanced; that is, the voltage between point 66 of the cathode of triode 60 and point 68 of the cathode of triode 62 is zero for a preselected output voltage from photocell 40, for example, in the case of no light on photocell 40. Therefore, potentiometer 64 may be varied as desired to vary the amplitude of the sawtooth waveform generated for calibration purposes.

The output voltage from cathode follower section circuit 42 is fed through resistance adder 70 and is impressed upon the voltage from position indicating potentiometer 52 which is fed through resistance adder 72. This resulting voltage is applied to the grid of a first triode of trigger circuit 56. Voltage from a main voltage supply source is supplied through plate resistors 74 and 76, respectively, to the plates of triode 78 and 80. The grid of triode 80 is electrically connected to the plate of triode 78 through resistors 84 and 87 combined with a capacitor 82 which speeds the switching action. One property of this trigger circuit is that when the input to the circuit is above a specified voltage level, it assumes one of two stable states. When the voltage is dropped below the specified level, the stable states are reversed. More specifically, when the combined voltage as illustrated in FIG. 3–C is above line E, triode 78 is rendered conductive and triode 80 is non-conductive. When the voltage fed to the grid of triode 78 is less than the preselected value, triode 78 is non-conductive and triode 80 is conductive. When triode 80 is non-conductive, the voltage across magnetic head 58 is positive with respect to a reference voltage maintained by resistors 86 and 88. When triode 80 is conductive, its plate is negative with respect to the reference point, the current to head 58 is reversed, and head 58 records a negative pulse.

Referring now especially to FIG. 1, the apparatus shown therein may be operated substantially as follows: First, a seismogram or a visual oscillographic trace is placed on support 19 and a magnetic recording medium, such as magnetic tape, is placed on drum 34. The supports are then adjusted so as to have stylus 22 and recording head 58 properly aligned relative to the seismogram and the magnetic recording medium, respectively. The stylus, for example, is centered over and at one end of a trace on a seismogram; and the recording head is similarly placed at a predetermined point on the magnetic recording medium.

Longitudinal movement of stylus 22 along seismogram 10 is realized by starting motor 24. This motor drives lead screw 18 which drives lower carriage 14. It will be noted that the lower carriage 14 is provided internally with threads which engage the threads of lead screw 18 so that rotation of the screw causes the carriage member to advance along the length of the screw.

Stylus 22 is moved along the length of a trace of seismogram 10 by means of motor 24 at a rate controlled by the operator. The operator similarly controls lateral movement of the stylus to follow amplitude variations in the trace—in this case by a simple manual procedure. As stylus 22 moves longitudinally with respect to seismogram 10, the magnetic recording medium on drum 34 which is preferably magnetic tape, is rotated on a recording head 58 at a rate proportional to the longitudinal movement of stylus 22. When stylus 22 has negotiated the length of each trace, magnetic recording is discontinued and the direction of travel of the stylus is reversed and it is returned to the opposite end of seismogram 10. At this point, support member 19 is moved as desired so as to enable the operator to transcribe another trace of a seismogram with the recording head 58 being moved laterally relative to magnetic tape 12. The scanning operation is then repeated for this new trace and the entire sequence is repeated until all of the traces have been scanned.

As stylus 22 travels longitudinally along each trace on seismogram 10, magnetic recording tape 12 similarly travels under recording head 58. Simultaneously with the movements of stylus 22, shutter 36 rotates on its shaft and repeatedly varies the light reaching photocell 40 linearly from a minimum to a maximum with a cut-off at the maximum back to the minimum light. In other words, the intensity of the light received by photocell 40 is in the form of a sawtooth. Likewise, the voltage passed through photocell 40 is in the form of a sawtooth waveform. Simultaneously, stylus 22 is being moved laterally following the amplitude variations of the oscillographic trace being transcribed. The lateral movement of stylus 22 moves upper carriage 46 and rack 44. This movement rotates pinion 48 which, in effect, varies the output voltage of amplitude position indicating potentiometer 52.

The output voltage from photocell 40 is fed to cathode follower section 42. The output from cathode follower section 42 is a sawtooth voltage waveform. This waveform is added to the amplitude indicating voltage waveform from potentiometer 52 at adding means 54. The voltage waveform from adder 54 is fed to trigger circuit 56. When the voltage of the signal from adder 54 is above a predetermined trigger level, trigger circuit 56 emits a positive pulse. When the value is below such trigger level, trigger circuit 56 emits a negative pulse. The output of trigger 56 is then fed to head 58 which saturates the magnetic tape 12 on drum 34. As shutter 36, stylus 22 and drum 34 are mechanically coupled, it is seen that the leading edge of each pulse occurs at fixed spaced intervals along the magnetic recording medium. The trailing edge of the pulses then are seen to vary according to the amplitude of the trace being transcribed. Pulses then occur at fixed spaced intervals along the magnetic recording medium.

In seismic operations, the magnetic recording medium will represent normally 7.5 inches per second of time as indicated on the original seismogram. The pulse occurrence rate should be sufficiently high to provide proper sampling at the highest seismic frequency recorded, which normally is about 200 c.p.s. At a carrier repetition rate of 800 c.p.s., 1600 pulses are recorded in 7½″ of magnetic record. This means about 200 pulses per inch of magnetic record. In terms of frequency, this means a 200 cycle signal is sampled four times per cycle which is a satisfactory operating figure.

In any event, the number of samples should be sufficient to permit reconstruction of the seismic curve being recorded from the recorded modulated signal. It is also preferred that when stylus 22 is in a neutral position on zero base line with respect to the trace which it is scanning, that the pulses recorded on the magnetic tape will be evenly divided between positive and negative. In other words, the trigger voltage level is ½ of the peaks of the sawtooth waveform. It is thus seen that a pulse width modulated record is made on a magnetic recording medium in which the pulse width is proportional to the amplitude of the signal and is independent of the rate at which the visual trace is scanned.

It will be noted that the foregoing description is concerned with one preferred structural embodiment of the invention. It will be apparent that numerous modifications may be incorporated therein, without departing from the spirit or scope of the invention.

What is claimed is:

1. An apparatus for transcribing conventional oscillographic seismic records to pulse width modulated recording magnetic medium records which comprises: a magnetizable medium, a magnetic recording head, mounting means for said oscillographic seismic records, scanning means capable of lateral and longitudinal movement with respect to said mounting means, means to effect relative movement between said magnetic recording head and said medium with said movement being proportional to the longitudinal movement between said scanning means and said mounting means, a photoelectric cell, a light source spaced from said photoelectric cell, light interrupting means to interrupt the light from said light source to said photoelectric cell, synchronizing means responsive to said scanning means to control the light interrupting means so that the intensity repeatedly varies from a minimum to a maximum with a sharp cut-off from the maximum to the minimum as said scanning means moves longitudinally with respect to said seismogram, a cathode follower section electrically connected to said photoelectric cell, potentiometer means which has an output voltage indicative of the amplitude of the seismic signal, means for adding the output voltage from said cathode follower and from said potentiometer means, a trigger circuit electrically connected to receive the resultant voltage from said adder means, said trigger circuit means being of a character to have a positive output pulse when said resultant voltage is above a predetermined level and a negative output when said resultant voltage is below a predetermined level, and means electrically connecting the output of said trigger circuit with said recording head.

2. An apparatus as defined in claim 1 in which said cathode follower section includes two balanced triodes.

3. An apparatus as defined in claim 1 in which said cathode follower section circuit includes two balanced triode cathode followers with a potentiometer means connecting the cathodes of each triode.

4. An apparatus for transcribing conventional wiggly trace seismic records to pulse width modulated recording magnetic medium records which comprises: a magnetizable medium, a magnetic recording head, mounting means for said wiggly trace seismic records, scanning means capable of lateral and longitudinal movement with respect to said mounting means, means to effect relative movement between said magnetic recording head and said medium with said movement being proportional to the longitudinal movement between said scanning means and said mounting means, sawtooth generating means to generate a sawtooth waveform for each preselected interval of longitudinal movement of said scanning means, potentiometer means having an output voltage indicative of the amplitude of the seismic signal, means for adding the output voltage from said sawtooth generating means and the voltage from said potentiometer means, a trigger circuit electrically connected to receive the resultant voltage from said adder means, said trigger circuit means being of a character to have a positive output pulse when said resultant voltage is above a predetermined level and a negative output when said resultant voltage is below a predetermined level, and means electrically connecting the output of said trigger circuit with said recording head.

5. An apparatus for transcribing conventional wiggly-trace seismic records to a pulse width modulated record which comprises: a recording medium, a recording head, mounting means for supporting said wiggly-trace seismic records, scanning means capable of lateral and longitudinal movement with respect to said mounting means; means to effect relative movement between said recording head and said medium, synchronizing means responsive to the longitudinal movement between said scanning means and said mounting means to control the movement between said recording head and said medium; sawtooth generating means to generate a sawtooth waveform for each preselected interval of longitudinal movement of said scanning means; signal generating means having an output voltage responsive to the lateral position of said scanning means; adding means for adding the output voltage from said signal generating means and the voltage from said sawtooth generating means; a circuit means electrically connected to receive the resultant voltage from said adding means, said circuit means being of a character to have an output pulse of one polarity when said resultant voltage is above a predetermined level and an output of the opposite polarity when said resultant voltage is below a predetermined level; and means responsive to the output of said circuit means for controlling the recording of said recording head on said medium.

6. An apparatus for transcribing conventional oscillographic seismic records which may be mounted on a support to pulse width modulated recordings which comprises: a magnetizable medium, a magnetic recording head, scanning means capable of longitudinal and lateral movement with respect to said record so as to scan along said oscillographic seismic record, means to effect relative movement between said magnetic recording head and said medium proportional to the rate of the longitudinal component of the scanning of said record, sawtooth generating means to generate a sawtooth waveform for each preselected interval of longitudinal movement of said scanning means; a cathode follower section electrically connected to said sawtooth generating means; potentiometer means responsive to the lateral movement of said scanning means and which has an output voltage indicative of the amplitude of the seismic signal, adding means for adding the output voltage from said cathode follower and from said potentiometer means, a trigger circuit means electrically connected to receive the resultant voltage from said adding means, said trigger circuit means being of a character to have an output pulse of one polarity when said resultant voltage is above a predetermined level and an output of the opposite polarity when said resultant voltage is below a predetermined level; and means electrically connecting the output of said trigger circuit means with said magnetic recording head.

7. An apparatus as defined in claim 6 in which said sawtooth generating means include a photo-electric cell, a light source spaced from said photo-electric cell, a light shutter between said light source and said photo-electric cell and means responsive to the longitudinal movement of said scanning means so as to control the movement of said shutter such that the intensity of the light reaching the photo-electric cell from said light source varies from a minimum to a maximum with a sharp cut-off for each predetermined interval of longitudinal movement of said scanning means.

8. In an apparatus for translating a seismic wiggly-trace from a seismogram to a magnetic recording medium responsive to a recording head including mounting means for supporting the seismogram, scanning means for scanning along the trace and having lateral movement and driving means to effect longitudinal movement of said translation means with respect to the seismogram, the improvement which comprises: generating means to generate a sawtooth waveform for each preselected interval of longitudinal movement of said scanning means, potentiometer means having an output voltage indicative of the lateral position of said scanning means, adding means for summing the output voltage from said generating means and the voltage from said potentiometer means, a trigger circuit electrically connected to receive the summed voltage from said adding means, said trigger circuit means being of a character to have an output pulse of one polarity when said resultant voltage is above a predetermined level and an output voltage of the opposite polarity when the said summed voltage is below a predetermined level, and means electrically connecting the output of said trigger circuit to said recording head.

References Cited in the file of this patent

UNITED STATES PATENTS

| | | |
|---|---|---|
| 2,791,288 | Meier | May 8, 1957 |
| 2,887,674 | Greene | May 19, 1959 |
| 2,924,653 | Fairchild | Feb. 9, 1960 |

FOREIGN PATENTS

| | | |
|---|---|---|
| 1,181,561 | France | Jan. 12, 1959 |